May 27, 1947.  P. J. HERBST  2,421,263
MAGNETOSTRICTIVE ELECTROACOUSTIC TRANSDUCER
Filed Jan. 3, 1940  2 Sheets—Sheet 1

Inventor
Philip J. Herbst
By
Attorney

Patented May 27, 1947

2,421,263

UNITED STATES PATENT OFFICE 2,421,263

MAGNETOSTRICTIVE ELECTROACOUSTIC TRANSDUCER

Philip J. Herbst, Fort Wayne, Ind., assignor to Radio Corporation of America, a corporation of Delaware Application January 3, 1940, Serial No. 312,295

12 Claims. (Cl. 177—386)

This invention relates to electroacoustic transducers and especially to magnetostrictive devices in which magnetostrictive forces drive a diaphragm or forces applied to the diaphragm establish currents by means including magnetostrictive forces. Furthermore, this invention relates to a magnetostrictive electroacoustic transducer in which the polarizing field is established by a novel arrangement of permanent magnets.

It has already been proposed to employ a magnetostrictive transducer for the generation or detection of sound waves of sonic or supersonic frequency. While in the practical application of such transducers the polarization has been produced by electromagnetic means, it has been suggested that permanent magnets could be employed. However, no practical arrangement has been disclosed and furthermore no suggestion as to the flux distribution of the permanent magnetic fields has been advanced.

In the present invention, several different permanent magnet arrangements, each lending itself to particular flux distribution of the permanent field, are disclosed. The use of permanent magnets increases the efficiency of the device by eliminating the power source required for electromagnetic polarization and the power applied therefor. Furthermore, the field coils required for energizing the magnetostrictive elements with signal frequency currents or for deriving signals from applied sound waves may be made less bulky, because of the diminished period of the applied power. Furthermore, the device may be made smaller and less heat will be generated.

One of the objects of the invention is to provide means for increasing the efficiency of a magnetostrictive transducer. Another object is to provide permanent magnet means for polarizing a magnetostrictive device. An additional object is to provide means for applying polarizing fields of densities varying as a function of the distribution of magnetostrictive elements in an electroacoustic transducer.

Figure 1:
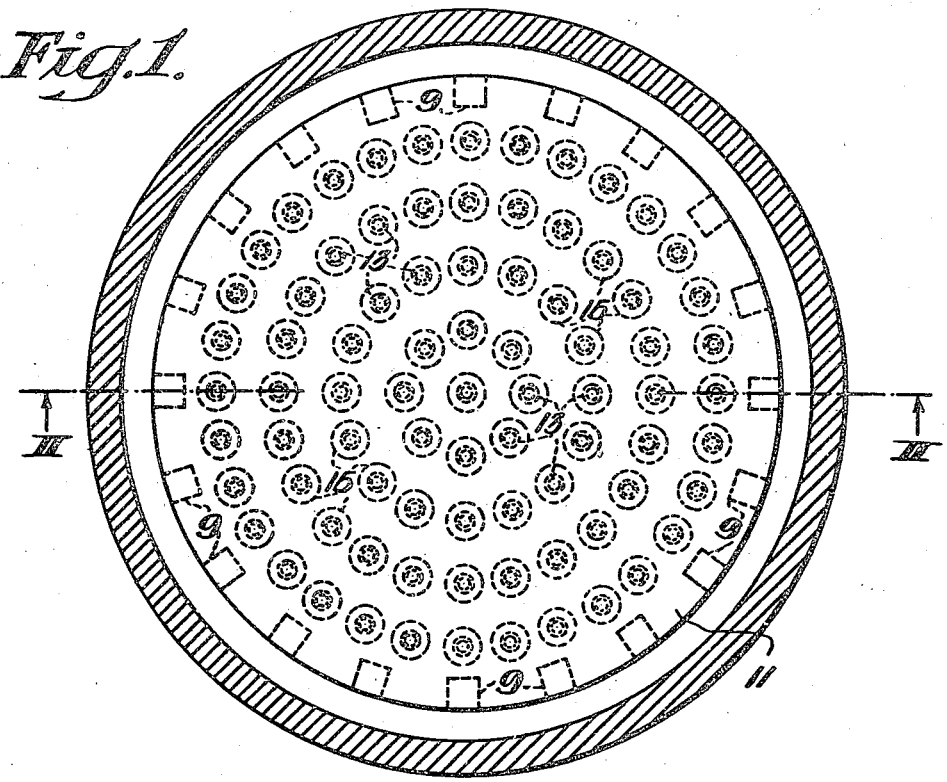
Figure 2:
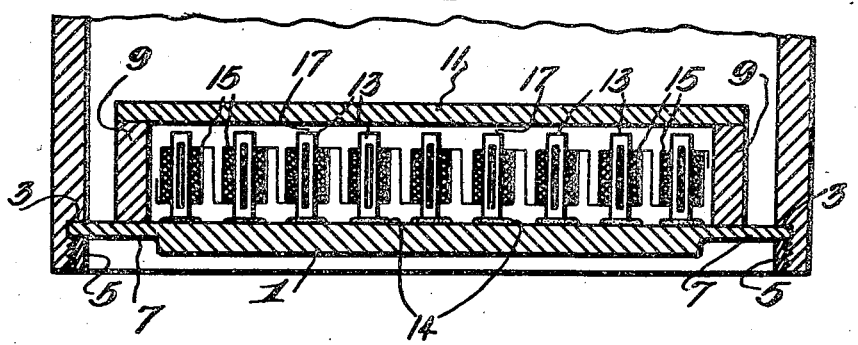
Figure 4:
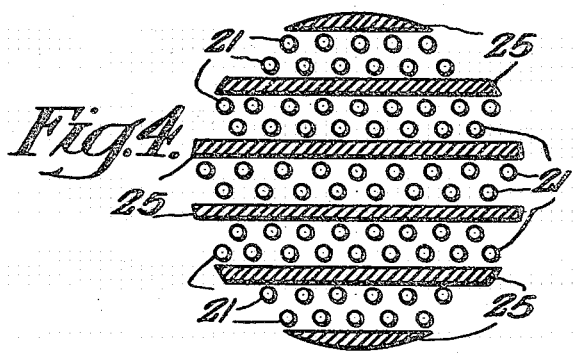
Figure 5:
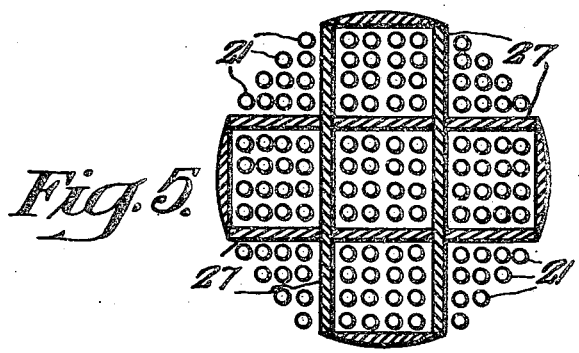

The invention will be described by referring to the accompanying drawings in which Figure 1 is a plan view, partly in section, of one embodiment of the invention; Figure 2 is a sectional view taken along line II—II of Fig. 1; and Figures 3, 4 and 5 are plan views representing modifications of the arrangement of permanent magnets employed in the invention.

Referring to Figs. 1 and 2, a magnetic diaphragm 1 is clamped at its circumference by means of the shoulder 3 and the clamping ring 5 which are suitably arranged in a housing not shown in detail. The diaphragm preferably includes a recessed outer portion 7 and central portion of increased thickness whereby the central portion of the diaphragm may be moved substantially as a whole. A plurality of permanent magnets 9 are secured adjacent the circumference of the diaphragm. A back plate 11 of magnetic material is disposed parallel to the diaphragm and is mounted on the permanent magnets. The permanent magnet field structure is completed by the plurality of magnetostrictive elements 13 which are arranged in any desired pattern between the diaphragm and back plate and are secured, each at one end, to the diaphragm 1 in any suitable manner, as by means of solder 14 or the like.

Each magnetostrictive element, which may be a slotted nickel steel tube, is surrounded by a signal coil 15 upon which the signalling currents are impressed for transmission and from which the signalling currents are derived during reception. The magnetostrictive elements are preferably separated from the back plate by small air gaps 17, and are firmly united to the diaphragm by welding, soldering, swaging or other suitable means. It is preferable that the reluctance of the air gap be made small compared to the reluctance of the path through the elements. It should be understood that the density of the magnetic flux through each of the magnetostrictive elements may be determined either by selecting the air gaps or by changing the thickness of the back plate 11. It should be understood that, by suitably adjusting the strength of the polarizing field, the maximum driving force may be applied to the diaphragm. If the polarizing fields are adjusted as a function of the distribution of the magnetostrictive elements, then predetermined, suitable driving forces may be caused to be applied to different sections of the diaphragm to cause the respective sections to move or vibrate at different amplitudes, thereby resulting in different directional patterns. By suitably phasing the alternating currents in the signal coils 15, the several sections of the diaphragm may be caused to vibrate at different phases, thereby resulting in either a change in direction of the pattern or a change in sharpness of the pattern, depending on the manner of the phasing. In a similar manner, the central portion of the diaphragm may be moved more or less than its peripheral portions.

Figure 3:
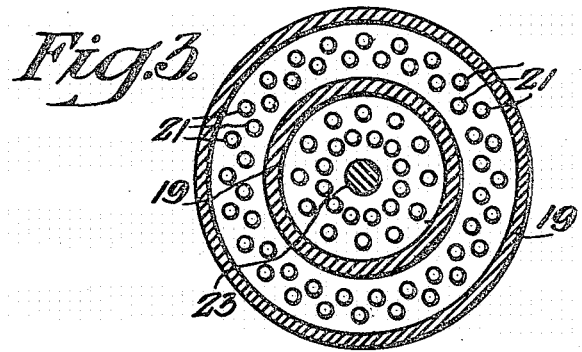

Instead of arranging the permanent magnets as shown in Figs. 1 and 2, the field may be obtained by one or more cast, coaxially arranged, permanent magnets 19 of annular form as shown in Fig. 3. The back plate 11 of Fig. 2 is used in conjunction with the annular magnets. The magnetostrictive elements 21 are arranged in any desired pattern within the annular magnets 19 and the central magnet 23.

Further modifications of the permanent magnets are illustrated in Figs. 4 and 5. In Fig. 4, the permanent magnets 25 are shown arranged in parallel rows. In Fig. 5, the permanent magnets 27 are illustrated as arranged to form a grid-like arrangement. If the permanent magnets are interspersed among the magnetostrictive elements, proper precautions should be taken to minimize energy absorption.

Thus, the invention has been described as a magnetostrictively operated electroacoustic transducer in which permanent magnets are used to apply the polarizing flux to the magnetostrictive elements. The magnets are arranged to provide the desired flux distribution so that the diaphragm may be moved in a predetermined phasal relationship. For example, the flux may be distributed among the elements by varying the air gaps between the elements and the back plate so that the applied driving currents move the diaphragm as a whole.

I claim as my invention:

1. An electroacoustic transducer including in combination a plurality of magnetostrictive elements, an acoustic diaphragm, said diaphragm having magnetic characteristics, means securing said elements to said diaphragm, means for applying variable currents to actuate said elements or for deriving variable currents from said elements when they are actuated by forces applied to said diaphragm, and permanent magnet means in engagement with said diaphragm for applying magnetic forces to said elements, said magnet means being spaced at different distances from said elements whereby said forces are variably distributed among said elements.

2. An electroacoustic transducer including in combination an acoustic diaphragm having magnetic characteristics, means mounting said diaphragm for vibratory movement in a predetermined direction, a plurality of magnetostrictive elements each mounted at one end on said diaphragm in a manner such that the axes of said elements are parallel to the direction of movement of said diaphragm, a plurality of coils actively associated with said elements, a back plate of magnetic material spaced from the free ends of said elements, and permanent magnet means positioned between and having magnetic coupling with both said back plate and said diaphragm arranged to transfer a polarizing magnetic force to said elements.

3. An electroacoustic transducer including a magnetic diaphragm, a plurality of magnetostrictive elements each mounted at one end on said diaphragm and arranged to drive the diaphragm or to be driven thereby, a back plate of magnetic material spaced from the free ends of said elements and substantially parallel to said diaphragm, and permanent magnet means located between and in magnetically coupled relation with both said diaphragm and said back plate for applying magnetic polarizing flux to said elements.

4. An electroacoustic transducer including a magnetic diaphragm, a plurality of magnetostrictive elements each mounted at one end on said diaphragm and arranged to drive the diaphragm or to be driven thereby, a back plate of magnetic material spaced from the free ends of said elements and substantially parallel to said diaphragm, and permanent magnet means located between and in magnetically coupled relation with both said diaphragm and said back plate for applying to certain of said elements a magnetic polarizing flux which differs from that applied thereby to others of said elements and in a manner such that said diaphragm will be driven substantially as a whole.

5. An electroacoustic transducer including a magnetic diaphragm, a plurality of magnetostrictive elements each mounted at one end on said diaphragm and arranged to drive the diaphragm or to be driven thereby, a back plate of magnetic material spaced from the unmounted ends of said elements, and annular permanent magnet means positioned between and in magnetically coupled relation with both said back plate and said diaphragm for applying magnetic polarizing flux to said elements.

6. A transducer as set forth in claim 5 characterized in that said permanent magnet means includes a plurality of coaxially arranged, annular magnets.

7. An electroacoustic transducer including a magnetic diaphragm, a plurality of magnetostrictive elements each mounted at one end on said diaphragm and arranged to drive the diaphragm or to be driven thereby, a back plate of magnetic material spaced from the unmounted ends of said elements, and grid-like permanent magnet means positioned among said elements, said magnet means having magnetic coupling with both said diaphragm and said back plate and being arranged to distribute varied magnetic polarizing flux to said elements.

8. An electroacoustic transducer including in combination a magnetic diaphrabm having a central portion and a recessed peripheral portion, a plurality of magnetostrictive elements each secured at one end to the central portion of said diaphragm and arranged to drive said diaphragm or to be driven thereby, a plurality of permanent magnets in engagement with said diaphragm, and a magnetic plate supported by said magnets in spaced relation to said diaphragm and to the free ends of said elements, said magnets being arranged to apply polarizing forces to said elements and being located adjacent the recessed portion of said diaphragm.

9. An electroacoustic transducer including in combination a magnetic diaphragm having a central portion and a recessed peripheral portion, a plurality of magnetostrictive elements each secured at one end to the central portion of said diaphragm and arranged to drive the central portion of said diaphragm or to be driven thereby, two coaxially arranged annular permanent magnets in engagement with said diaphragm, one of said magnets being located about the recessed portion of said diaphragm, the other of said magnets being located within the first-mentioned magnet and on said central portion, and means for transferring the flux from said permanent magnets to said elements.

10. A transducer of the character of claim 3 in which the spacing between said magnetostrictive elements and said back plate is nonuniform to distribute the polarizing flux nonuniformly and thereby aid in driving different portions of said diaphragm in accordance with a predetermined phasal relation.

11. A transducer of the character of claim 8 in which the polarizing forces are nonuniformly distributed over said elements so that different portions of said diaphragm may be driven in accordance with a predetermined phasal relation.

12. An oscillator for transmitting or receiving directively high frequency compressional waves comprising a casing having two opposed cover elements of materials permeable to magnetic flux, one serving as a radiating plate, a great number of magnetostrictive tubes mounted rigidly in said radiating plate, individual coil elements for energizing said magnetostrictive tubes and a great number of permanent magnet elements supported in positions parallel to said magnetostrictive tubes between the cover and the radiating plate and furnishing polarizing means for said magnetostrictive tubes.

PHILIP J. HERBST.

REFERENCES CITED

The following references are of record in the file of this patent:

UNITED STATES PATENTS

| Number | Name | Date |
| --- | --- | --- |
| 1,834,498 | Parshall | Dec. 1, 1931 |
| 1,882,401 | Pierce | Oct. 11, 1932 |
| 2,031,789 | Pierce | Feb. 25, 1936 |
| 2,044,807 | Noyes | June 23, 1936 |
| 2,059,107 | Hinton | Oct. 27, 1936 |
| 2,153,571 | Kallmeyer | Apr. 11, 1939 |

FOREIGN PATENTS

| Number | Country | Date |
| --- | --- | --- |
| 394,994 | Great Britain | July 5, 1933 |

Certificate of Correction

Patent No. 2,421,263.  May 27, 1947.

PHILIP J. HERBST

It is hereby certified that errors appear in the printed specification of the above numbered patent requiring correction as follows: Column 4, line 39, claim 8, for "diaphrabm" read *diaphragm*; column 6, line 12, in the list of references, after "Oct. 27, 1936", insert *2,063,949 Pierce December 15, 1936*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*